No. 658,195. Patented Sept. 18, 1900.
H. TUDOR.
SOLAR HEATER.
(Application filed Feb. 12, 1900.)
(No Model.)
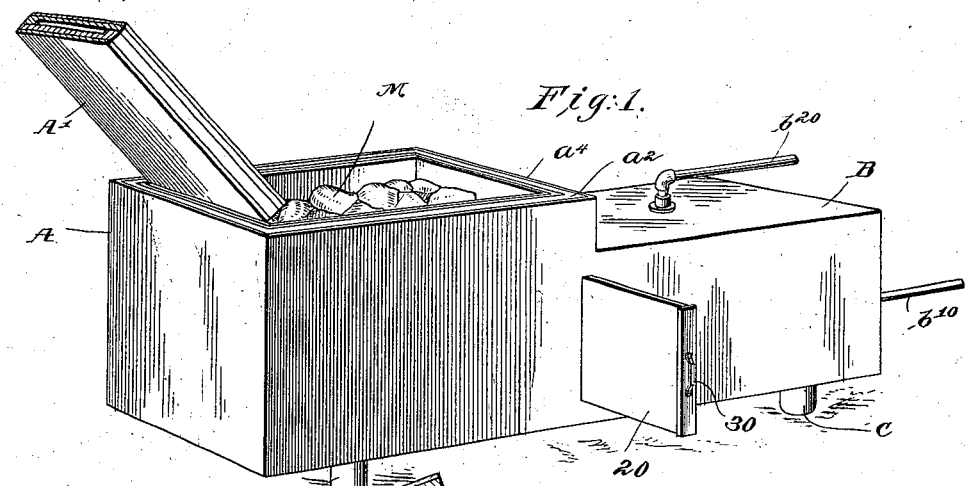
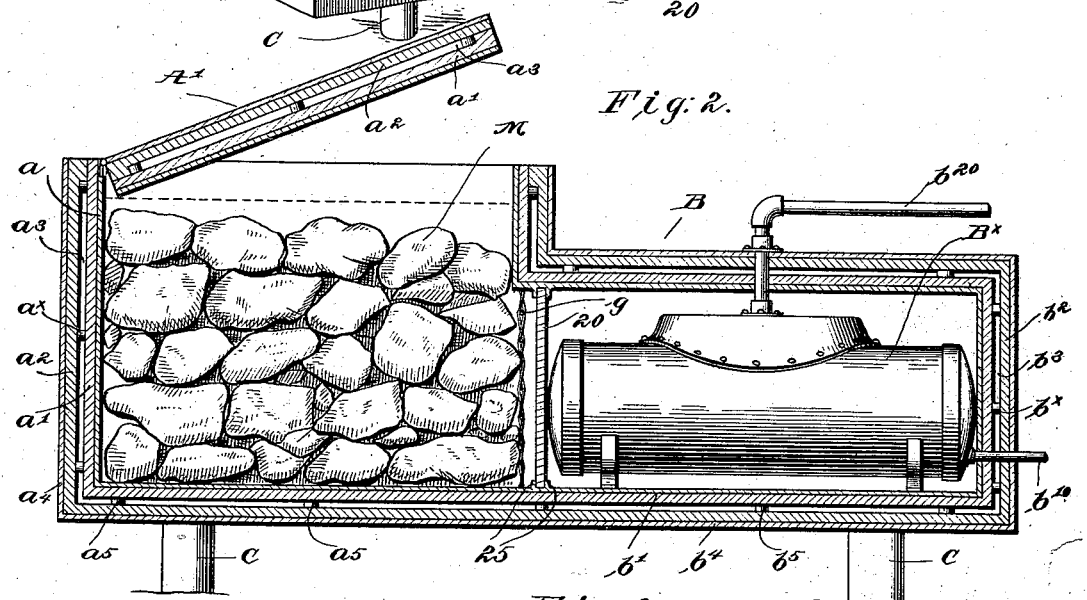
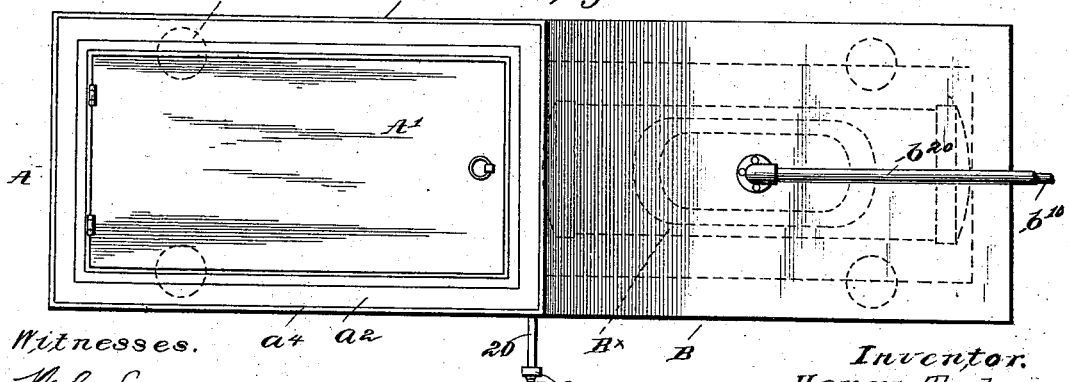
Witnesses.
W. C. Linsford
E. H. Allen.
Inventor.
Henry Tudor,
by Crosby Gregory,
Attys.

UNITED STATES PATENT OFFICE.

HENRY TUDOR, OF BOSTON, MASSACHUSETTS.

SOLAR HEATER.

SPECIFICATION forming part of Letters Patent No. 658,195, dated September 18, 1900.

Application filed February 12, 1900. Serial No. 4,889. (No model.)

*To all whom it may concern:*

Be it known that I, HENRY TUDOR, of Boston, county of Suffolk, State of Massachusetts, have invented an Improvement in Solar Heaters, of which the following description, in connection with the accompanying drawings, is a specification, like letters and numerals on the drawings representing like parts.

This invention has for its object the production of simple and effective means for utilizing the heat of the sun's rays in the performance of useful work; and my invention comprises, essentially, a compartment constructed and arranged to prevent heat radiation and containing material which will readily absorb heat when exposed to the rays of the sun and an adjacent closed compartment also constructed to prevent heat radiation and containing the devices by which the stored-up heat in the first-named compartment is to be utilized in performing useful work, communication between the two compartments being controlled at the will of the operator, and a movable cover for the heat-receiving compartment also constructed to prevent heat radiation.

Figure 1 is a perspective view of a solar heating apparatus embodying one form of my invention, the heat receiving or storage compartment being shown with its cover open. Fig. 2 is a longitudinal sectional view of the apparatus shown in Fig. 1, and Fig. 3 is a top or plan view thereof.

The apparatus is herein shown as comprising a compartment A, having a movable cover A', an adjacent closed compartment B, which is to contain the device to be heated—as, for instance, a steam-boiler $B^x$, provided with a steam-delivery pipe $b^{20}$ and a water-feed pipe $b^{10}$, Figs. 1 and 2—said compartments being preferably raised and supported on glass or other good non-heating radiating supports C, and the bottom, side walls, and tops of the compartments are constructed to prevent to a very high degree the radiation of heat therefrom.

The compartment A is shown as comprising an inner case $a$, two external coatings $a'$ $a^2$, of asbestos or other non-heat-radiating material, separated by a dead-air space $a^3$, and the whole inclosed in a suitable sheath $a^4$. The asbestos or other walls $a'$ $a^2$ are shown as separated by suitable ribs or bars $a^5$, Fig. 2, and the cover A' is constructed substantially as are the walls and bottom of the compartment, as described. The compartment B is constructed in a similar manner, the reference-letters $b'$ $b^2$, &c., being used to indicate corresponding portions of the compartment B. Communication between the compartments is normally interrupted in any suitable manner, as by a slide 20, movable in guides 25 on the interior of the compartment and provided with a suitable handle 30, (see Fig. 1,) so that when the slide is pushed in, one compartment will be completely shut off from the other.

I prefer to fill the compartment A with stones or other material which will readily absorb heat when exposed to the rays of the sun and which will present a large surface to be heated, and the stones or other heat-absorbent material, as M, Figs. 1 and 2, may be coated or painted with white lead or other suitable matter.

The operation of the apparatus will be manifest from the foregoing and from an inspection of the drawings, the cover A' being thrown back when the sun is shining, so that the rays thereof will have access to the contents of the heat-receiving compartment M. When the effective force of the rays begins to diminish, the cover is closed, thus tightly sealing the compartment and retaining the heat therein by reason of the non-heat-radiating construction hereinbefore described, and then the slide is drawn out to permit the passage of the heat as it is driven off from the compartment A to the boiler or other device to be heated in the compartment B. When the slide is withdrawn, the contents of the compartment A will be kept in place in any suitable manner—as, for instance, by a vertical grating $g$ between such contents and the slide.

The construction of the apparatus is exceedingly simple and will provide a ready means for utilizing sun heat in all places where the sun's rays possess great power for fairly long periods of time during the day.

My invention is not restricted to the precise construction and arrangement herein shown, as the same may be modified or rearranged without departing from the spirit and scope of my invention.

Having described my invention, what I claim, and desire to secure by Letters Patent, is—

1. In an apparatus of the class described, a heater comprising a compartment having an open top and constructed to prevent radiation of heat, heat-absorbing material in said compartment, to be heated by exposure to the sun, a closed compartment constructed to prevent heat radiation and containing the device to be heated, means to control communication between said compartments, and a non-heat-radiating cover to be applied to the open compartment when its contents have been heated.

2. In an apparatus of the class described, a closed compartment to contain the device to be heated, an open compartment containing heat-absorbing material to be heated by exposure to the sun, means to control communication between said compartments, whereby absorbed heat may pass to the closed compartment, a double-walled heat-insulating covering for said compartments inclosing a dead-air space, to prevent radiation of heat from both compartments, and a removable cover for the heat-absorbing compartment, also constructed to prevent heat radiation.

In testimony whereof I have signed my name to this specification in the presence of two subscribing witnesses.

HENRY TUDOR.

Witnesses:
GEO. W. GREGORY,
AUGUSTA E. DEAN.